US012001043B2

(12) United States Patent
Zeuner et al.

(10) Patent No.: US 12,001,043 B2
(45) Date of Patent: Jun. 4, 2024

(54) OPTICAL DEVICE FOR CONTROLLING LIGHT FROM AN EXTERNAL LIGHT SOURCE

(71) Applicants: VitreaLab GmbH, Vienna (AT); CONSIGLIO NAZIONALE DELLE RICERCHE, Rome (IT)

(72) Inventors: Jonas Zeuner, Vienna (AT); Chiara Greganti, Vienna (AT); Roberto Osellame, Rome (IT)

(73) Assignees: Vitrealab GMBH, Vienna (AT); Consiglio Nazionale Delle Ricerche, Rome (IT)

( * ) Notice: Subject to any disclaimer, the term of this patent is extended or adjusted under 35 U.S.C. 154(b) by 0 days.

(21) Appl. No.: 17/756,734

(22) PCT Filed: Dec. 4, 2020

(86) PCT No.: PCT/EP2020/084677
§ 371 (c)(1),
(2) Date: Jun. 1, 2022

(87) PCT Pub. No.: WO2021/110936
PCT Pub. Date: Jun. 10, 2021

(65) Prior Publication Data
US 2023/0020133 A1    Jan. 19, 2023

(30) Foreign Application Priority Data
Dec. 4, 2019  (EP) ..................................... 19425085

(51) Int. Cl.
*G02B 6/00*    (2006.01)
*F21V 8/00*    (2006.01)
(Continued)

(52) U.S. Cl.
CPC ......... *G02B 6/0036* (2013.01); *G02B 6/0075* (2013.01); *G02B 2006/12159* (2013.01); *G03H 1/0005* (2013.01)

(58) Field of Classification Search
CPC ................ G02B 6/0036; G02B 6/0075; G02B 2006/12159
See application file for complete search history.

(56) References Cited

U.S. PATENT DOCUMENTS 9,395,690 B2    7/2016  Futterer
2009/0180282 A1*    7/2009  Aylward ........... G02F 1/133605
362/245
(Continued)

FOREIGN PATENT DOCUMENTS

WO    2007/046100 A2    4/2007

OTHER PUBLICATIONS

International Search Report for corresponding International Application No. PCT/EP2020/084677 dated Feb. 3, 2021.
(Continued)

*Primary Examiner* — Julie A Bannan
(74) *Attorney, Agent, or Firm* — Pearne & Gordon LLP (57) ABSTRACT

An optical device for controlling light from an external light source including: at least a first and a second waveguide for guiding a light beam emitted from the external light source; and at least a first beam shaping structure with a first light emitting area for emitting a light beam and a second beam shaping structure with a second light emitting area for emitting a light beam, wherein the first waveguide guides the light beam emitted from the external light source to the first beam shaping structure and the second waveguide guides the light beam emitted from the external light source to the second beam shaping structure; wherein the first and the second beam shaping structure-are each configured such that
(Continued)

the uniformity of the radiant density profile of a light beam emitted from the respective light emitting area of the respective beam shaping structure is higher than that of the light beam guided to the respective beam shaping structure by the respective waveguide. Backlight unit including such an optical device; and optical system, in particular holographic display, including such a backlight unit and a spatial light modulator.

19 Claims, 6 Drawing Sheets

(51) Int. Cl.
    *G02B 6/12*     (2006.01)
    *G03H 1/00*     (2006.01)

(56) References Cited

U.S. PATENT DOCUMENTS

2010/0259804 A1* 10/2010 Buschbeck .......... G03H 1/2286
                                                                                           359/34
2011/0102804 A1     5/2011 Lipson et al.
2013/0100696 A1     4/2013 Brick et al.
2013/0308339 A1   11/2013 Woodgate et al.

OTHER PUBLICATIONS

Written Opinion for corresponding International Application No. PCT/EP2020/084677 dated Feb. 3, 2021.
Extended European Search Report for corresponding application EP19425085.8, dated May 20, 2020.

\* cited by examiner

OPTICAL DEVICE FOR CONTROLLING LIGHT FROM AN EXTERNAL LIGHT SOURCE

CROSS-REFERENCE TO RELATED APPLICATIONS

This is a National Stage application of PCT international application PCT/EP2020/084677 filed on Dec. 4, 2020, which claims the priority of European Patent Application No. 19425085.8, filed Dec. 4, 2019, which are incorporated herein by reference in their entireties.

FIELD OF THE INVENTION

The invention relates to an optical device for controlling light from an external light source comprising at least a first and a second waveguide for guiding a light beam emitted from the external light source, and at least a first beam shaping structure with a first light emitting area for emitting a light beam and a second beam shaping structure with a second light emitting area for emitting a light beam, wherein the first waveguide guides the light beam emitted from the external light source to the first beam shaping structure and the second waveguide guides the light beam emitted from the external light source to the second beam shaping structure.

BACKGROUND OF THE INVENTION

Some optical devices are known that distribute coherent light over a larger area. This is for example necessary for backlight units of holographic displays. Holographic displays are able to essentially faithfully recreate the light field emitted by an object and hence become visually indistinguishable from it. They have substantial advantages over e.g. (auto-)stereoscopic displays, which provide one image per eye and thus introduce a sense of three-dimensionality, but encounter a fundamental problem: since the brain perceives a three-dimensional (3D) scene, the eye should be able to focus on arbitrary parts within it, but only one focus-plane of the scenery can be shown by the display. This mismatch causes visual fatigue and nausea, which is a major problem and one of the factors prohibiting the widespread adoption of 3D displays. Holographic displays avoid this problem and the image created appears completely natural to the eye.

The task of dynamically creating the wavefront is performed by spatial light modulators (SLMs) that can alternate the relative phase (and amplitude) between pixels between 0 and $2\pi$ and therefore create arbitrary wavefronts. Both transmissive SLMs, which work analogously to liquid crystal displays, and reflective SLMs, i.e. liquid crystal on silicon (LCOS) and/or digital light processing (DLP), have already been used to create holographic images. Both SLM and LCOS are compact and suitable for use in e.g. head-mounted holographic goggles.

A key challenge though, is how to supply the SLM with the coherent plane-wave in a compact and reliable way. While it is relatively easy to expand a laser beam to a large diameter using lenses in a laboratory environment, this approach is neither practical nor economical for commercial devices, due to for instance the large dimensions. Interference based backlight units can be realized in a rather compact and even transparent way, and various types have been demonstrated/proposed. Interference based devices are very sensitive to temperature and humidity changes and a compensation of these effects is not possible, since the phases of emitted beams are not well-defined or well determinable under such conditions, which pose a challenge for commercial applications. In particular for consumer hardware this is a problem, because the standard temperature range reaches from 0° C. to 70° C. The often used holographic volume gratings are also susceptible to both temperature and humidity changes, causing changes in the emitted wavefront and hence a reduction of the holographic image quality which can also not be sufficiently compensated for due to the same reasons. Furthermore, the efficiency of holographic gratings is still a major challenge.

Backlight units for conventional displays, i.e. producing a non-coherent backlighting, are well known. For example, US 2013/0308339 A1 discloses a light guiding valve apparatus with a transparent slab. The light emitted from a (coherent or non-coherent) light source spreads out in the slab acting as a single waveguide and is reflected at its surfaces. The transparent slab includes a stepped back surface which acts to emit the light from a front surface of the transparent slab. However, light leaving the front surface at one point can have taken a multitude of different optical paths within the slab, such that the emitted light cannot be coherent and its phases are not well-defined. Furthermore, the light is not emitted homogeneously over the front surface. This apparatus is therefore not suitable for example as a backlight unit for a holographic display.

On the other hand, U.S. Pat. No. 9,395,690 B2 shows a holographic display with an illumination device, an enlarging unit and a light modulator. The illumination device includes at least one light source and a light collimation unit. The light collimation unit collimates the light of the at least one light source. A cascade of fibre optic switches in the light collimation unit allows to illuminate lenses of a collimation lens array. The collimation lens array can comprise cylindrical lenses. However, this does not allow a compact design. The subsequent use of transmissive volume gratings further reduces the well-definedness of the phases on being emitted and in connection with this also the stability to changes in ambient conditions, e.g. ambient temperature. Therefore, it does not provide a stable coherent light homogeneity over some area.

US 2009/180282 A1 shows an LCD backlight unit. Therein light spreads in a slab and is extracted therefrom by a plurality of light extraction features. Therefore, light takes arbitrary paths, no coherent light is provided and the uniformity of the light extracted by each light extraction feature is not increased.

US 2010/259804 A1 shows an illumination unit with waveguides and output coupling elements. However, the output coupling elements merely emit light, but the uniformity of the light emitted from each output coupling element is not increased.

Therefore, none of the optical device that are known are suitable for a compact, in particular flat, and reliable holographic display. However, optical devices that distribute coherent light over a larger area are also required for other applications, such as structured light sensing (3D sensing) or LIDAR. In particular, the efficiency of the optical device is also a very important aspect for these applications and is, additionally to the other points, not sufficiently achieved by the present optical devices.

BRIEF SUMMARY OF THE INVENTION

It is an objective of the present invention to resolve or alleviate at least some of the problems of the prior art and to provide an optical device which allows to homogeneously illuminate a certain area with coherent light in a compact way by controlling light from an external light source. In particular, in a compact way means that the optical device shall allow such illumination of the area, while having reduced dimensions normal to that area compared to a solution covering the same area essentially with a single beam shaping structure (e.g. a single set of lenses).

This is achieved by an optical device for controlling light from an external light source as mentioned in the outset, wherein the first and the second beam shaping structure are each configured such that the uniformity of the radiant density and/or intensity profile of a light beam emitted from a respective light emitting area of the respective beam shaping structure is higher than that of the light beam guided to the respective beam shaping structure by the respective waveguide.

In this way, a uniform illumination of the first and the second light emitting area can be achieved. At the same time, due to the light beams being guided by the first and the second waveguide to the respective beam shaping structure and being emitted from the respective light emitting area, the optical path of the light emitted from the respective light emitting area and therefore its phase are well-defined. Furthermore, from being coupled into the respective waveguide up to being emitted from the respective light emitting area, light from the first and the second respective elements will not interfere with each other and there will be no mixing between them. In other words, the present disclosure generally avoids mixing between the two or more optical paths used for covering the total light emitting area. Due to this separation of optical paths, the device is relatively insensitive to temperature changes and resulting deformations, maintaining coherence in each optical path individually. Ideally, the phase of the light at points in the area can be well-defined or is easily determinable, in particular in dependence on a temperature of the optical device or an ambient temperature. Furthermore, such a setup with at least a first and a second waveguide, wherein each of the first and second waveguides guides light to a beam shaping structure as defined above and is associated with one of the waveguides, allows for a more compact optical device compared to e.g. a single lens expanding a beam to a large diameter.

The influence of the beam shaping structure should manipulate the beam shape such that it becomes more similar to a top-hat beam shape. Under uniformity of the radiant density profile is understood the beam uniformity ($U_\eta$) as defined in ISO 13694:2018 for cw-beams, wherein $\eta$ is 0.3 and lower (i.e. closer to 0) $U_\eta$ means higher beam uniformity. Therefore, the uniformity of the radiant density profile of a light beam emitted from a respective light emitting area of the respective beam shaping structure is higher than that of the light beam guided to the respective beam shaping structure by the respective waveguide means that the beam uniformity of the light beam emitted from the respective light emitting area (on being emitted from the respective light emitting area) is higher, i.e. $U_\eta$ is lower and closer to 0, than the beam uniformity of the light beam guided to the respective beam shaping structure by the respective waveguide (on leaving the respective waveguide). $U_\eta$ is optionally reduced by the influence of the beam shaping structure by at least 0.05, at least 0.1 or by at least 0.2. Optionally, the beam uniformity is also increased (and therefore $U_\eta$ decreased) for $\eta$ being one of 0.1, 0.2, 0.4, 0.5, 0.6 or 0.7. This measure is to be applied under the assumption that the light beam supplied by the external light source is a Gaussian beam.

The optical device does not necessarily form a complete backlight unit, but could for example be one component of a backlight unit. The optical device does not necessarily need to emit plane waves, nor does the optical device necessarily comprise the external light source. The respective light emitting areas do not need to be physical surface areas, but could also, for example, be boundaries between different optical elements. The edges of the first and/or second light emitting area do not need to be structurally delimited, but they represent the area through which the light beam is emitted from the respective beam shaping structure. Furthermore, the light that is emitted from the first and/or the second light emitting area does not need to be immediately emitted from the optical device as well; however, it can be.

The optical device comprises at least two (i.e. the first and the second) waveguides. Preferably, the optical device comprises a number greater than two of waveguides for guiding a light beam emitted from the external light source, and a number greater than two of beam shaping structures, each of that number of beam shaping structures comprising a respective light emitting area for emitting a light beam, wherein each of the number of waveguides guides the light beam emitted from the external source to a respective one of the number of beam shaping structures, wherein each of the number of beam shaping structures is configured such that the uniformity of the radiant density profile of a light beam emitted from the respective light emitting area of the respective one of the number of beam shaping structures is higher than that of the light beam guided to the respective beam shaping structures by the respective waveguides. Consequently, also preferred embodiments of the first and second beam shaping structure and/or the first and second waveguide may also apply to the number of greater than two waveguides and/or beam shaping structures and additional elements interacting with the first and second waveguide and/or first and second beam shaping structure may also interact with the number greater than two of waveguides and/or beam shaping structure in an analogous manner. Preferably, the optical device comprises a number of at least ten waveguides, beam shaping structures and respective associated elements.

The at least first and second waveguide may be optical waveguides and may be distinct from each other, i.e. non-overlapping. The first and/or the second light emitting area can be plane or flat. The first and the second light emitting area may lie in the same plane. The first and the second light emitting area may be adjacent to one another, i.e. less than 10% of the largest dimension of the light emitting areas distanced from one another. Moreover, the first and the second light emitting area may be contiguous or essentially contiguous, at least in one or more directions. The first and/or the second light emitting area can for example have an elliptical, in particular circular, or hexagonal shape. The largest dimension of the first and/or the second light emitting area is preferably less than 1 mm. When used in a BLU for a holographic display, the light emitting areas of the optical device can, but do not need to correspond to pixels of the holographic display.

In an optional embodiment, the first and the second beam shaping structure each can comprise an optical shaping element and the first and the second waveguides direct the light beam emitted from the external light source at the respective optical shaping element of the first and the second beam shaping structure, and the optical shaping elements are configured for manipulating the wavefront and/or radiant intensity distribution of the light beam directed at the respective optical shaping element. Therein, preferably the manipulation is a bijective mapping and/or the light beam is manipulated such that rays of the light beam do not intersect. The manipulation should be such that the resulting light beam is coherent if the incoming light beam was coherent and/or such that the coherence length of the light beam is not reduced. Optionally, the phase profile distribution and the amplitude profile distribution are manipulated in the same way. Further optionally, the respective optical shaping element is distanced from the respective light emitting area. Optionally, the first and second waveguides direct the light beam at the respective optical shaping elements such that the light beam is directed towards the light emitting area after interfering with the respective optical shaping element.

The optical shaping element of the first and/or the second beam shaping structure may be an optical profiler element configured to increase the uniformity of the radiant intensity (or density) profile of the light beam directed at the respective optical shaping element. The optical profiler elements may in particular be configured for manipulating a Gaussian beam in such a way. Optionally, the optical profiler elements are configured for shaping a Gaussian beam into a top hat beam. The optical profiler elements may be diffractive optical elements (DOEs). In this way a certain area can easily be illuminated homogeneously with coherent light. Furthermore, this allows for a thin layout of the optical device.

In a further optional embodiment, the optical shaping element of the first and/or the second beam shaping structure may be an optical diverging element configured to increase the beam divergence of the light beam directed at the respective optical diverging element. The optical diverging elements can be mirrors, for example micro-mirrors, in particular curved micro-mirrors, or diffractive optical elements. The optical diverging elements widen the beam divergence angle, i.e. widen the radiant intensity distribution. This allows to illuminate a larger area with one light beam emitted from the external source. In another optional embodiment, each of the optical shaping elements is both an optical profiler element and an optical diverging element.

According to yet another optional embodiment, the optical device may comprise an interface, wherein the first and the second light emitting area are provided by the interface. For example, the first and second light emitting area can each be delimited by total internal reflection occurring outside the respective light emitting area for the light beam directed towards the interface after interfering with the respective optical shaping element. In this way, unwanted interference effects of light cones overlapping on the interface can be avoided by using total internal reflection. This allows to select only a part of the light beam/light cone to exit from the interface and the rest to be "cut-off". This "cut-off" effect can be used to select parts of the beam to be transmitted outside the light emitting area and subsequently be used for illumination purposes, while other parts are reflected at the interface. This can be used to create a uniform intensity distribution over the first and second light emitting area or the interface, respectively, because the center area of a light beam or of the light cone of that light beam can be selected, thus increasing the uniform intensity distribution. For example, the external light source may emit a Gaussian-like mode, and to limit the field intensity fluctuation over the interface (and/or the light emitting surface as defined below) to 20%, only the central part within approximately a radius including 50% of the beam intensity of the light beam is used while the rest is totally internally reflected. Furthermore, if the interface is provided as a front surface of a plate with a parallel back surface, the part of the light beam that experienced total internal reflection will never leave the plate through the interface and exit the plate on its side facets. This mechanism is particularly useful if the optical shaping elements are optical diverging elements. By adjusting how much the beam divergence is increased, it can be regulated which part of the light beam will leave the interface and which part will be totally internally reflected. The part that is totally internally reflected does not belong to the light beam which is emitted from the respective beam shaping structures and therefore from the respective light emitting areas. Therefore, in this way the uniformity of the radiant density profile of a light beam emitted from the respective beam shaping structure can be increased by cutting off an outer part of the beam. Optionally, the optical shaping elements may direct the light beam at the interface such that the light beam impinges on the interface perpendicularly. I.e. such that a central axis of the light beam defined by the first order moments of the power density distribution (as defined in ISO 13694:2018) for different z between the optical shaping element and the interface, is perpendicular to the interface. In this way the uniformity can be increased and the respective light emitting area can be circular.

The distance of the light emitting areas or the interface, respectively, from the respective optical shaping element and the distance of the optical shaping elements from each other is given by the used beam shaping technique and whether total internal reflection is used. For example, if Gaussian beams reflected from curved micro-mirrors are used in combination with total internal reflection the optical shaping elements are distanced from each other by ca. 880 µm, in particular from 886 µm if it should be configured for a blue light external light source to 877 µm for a red light external light source, for a distance of the optical shaping element to the interface of 500 µm.

The interface may be a boundary interface between a first medium (in which the light beam propagates before being emitted from the respective light emitting area) and a second medium, wherein the refractive index of the first medium is higher than or equal to the refractive index of the second medium. In particular, it can be a (glass) substrate to air boundary, or a substrate to substrate boundary.

It is advantageous if the first light emitting area is non-overlapping with the second light emitting area. In this way, coherent light beams (with a well-defined phase, or optical path length, respectively) are emitted from the interface.

Optionally, the optical device comprises a light emitting surface, wherein the first and the second light emitting area are provided by the light emitting surface and wherein a (preferably hexagonal) honeycomb structure of an absorptive material is provided on top of the light emitting surface. For example, a first (preferably hexagonal) cell of the (preferably hexagonal) honeycomb structure may encompass the first light emitting area and a second (preferably hexagonal) cell of the (preferably hexagonal) honeycomb structure may encompass the second light emitting area. The honeycomb structure and its cells could for example also be rhombohedral or triangular. The light emitting surface may be spaced apart from the optical shaping elements. Optionally, the light emitting surface is the interface. Usually, the light emitting areas will have an elliptical, in particular circular circumference. Therefore, a light emitting surface may not be able to be filled completely with light emitting areas without them overlapping and thus light beams from different optical paths interfering. By using a honeycomb structure on top of the light emitting surface, absorptive boundaries can be formed between different light emitting areas, therefore allowing to define the shape of spots of light beams with distinct optical paths and thus allowing to achieve a higher filling factor of illumination of the light emitting surface, of up to 100% (at the cost of additional optical loss). Alternatively, the light emitting surface can also be partially coated with an absorptive material to shape the light emitting areas and achieve an effect similar to an elevated honeycomb structure.

The optical device may comprise at least one bus waveguide for guiding the light beam emitted from the external light source and at least a first and a second optical coupler, in particular directional couplers (i.e. couplers provided to distribute the light from the bus waveguides to the waveguides by means of evanescent coupling), wherein the first optical coupler couples light emitted from the external light source from the bus waveguide to the first waveguide and the second optical coupler couples the light beam emitted from the external light source from the bus waveguide to the second waveguide. In particular, the first and/or second optical coupler, respectively, comprise and/or are formed (at least in parts) by the bus waveguide and the first and the second waveguide, respectively. The optical couplers can for example be formed simply by bringing the first and second waveguide, respectively, close enough to the bus waveguide. This allows for an easy distribution of a light beam emitted from the external light source to the first and the second waveguide. The bus waveguide can also guide light emitted from the external light source to the more than two waveguides and/or there can be provided for more than one bus waveguide. There can also be provided for at least one higher-level bus waveguide, guiding a light beam emitted from the external light source to at least one lower-ranking bus waveguide or coupling light into the lower-ranking bus waveguides by an optical coupler (and optionally to one or more beam shaping structures), wherein the lower-ranking bus waveguides guide light to one or more beam shaping structures.

The optical device may comprise a transparent substrate, wherein the first and the second waveguide are formed within the transparent substrate. In this way, the waveguides can easily be provided in a compact way and with narrow spacings between them. Furthermore, the temperature sensitivity is well known and can therefore easily be compensated for. For example, the first and the second waveguide are formed within the transparent substrate by means of direct laser writing, in particular femtosecond-laser writing. In this way, the transparent substrate can be very thin, for example having a thickness of less than 500 μm. (Femtosecond-)Laser written waveguides combine the ability to build optical circuits in 3D with low propagation losses (e.g. <0.2 dB/cm), high temperature stability, ease of fabrication and the integration with other (laser-written) micro-optics components. Moreover, also the at least one bus waveguide may be formed within the transparent substrate (again, for example, by means of direct laser writing). The light emitting surface and/or the interface can be provided by a (front) surface of the transparent substrate.

The first and second beam shaping structure may be at least partially provided by the transparent substrate, in particular the respective optical shaping elements can be provided by the transparent substrate. The optical shaping elements, e.g. in the form of micro-mirrors, can be machined to a very high precision and to almost arbitrary shape using (femtosecond-)laser ablation. Subsequently, they can for instance be polished via a ($CO_2$) laser to increase the surface quality. The optical shaping elements may, for example, be formed at or adjacent to a backside face of the substrate. Specifically, the optical shaping elements may be micro-mirrors formed at a backside face of the substrate. Also, the optical shaping elements could be diffractive optical elements contacting a backside face of the substrate. The backside face is for example a surface opposite the front surface, in particular opposite the light emitting surface and/or opposite the interface (disregarding eventually formed optical shaping elements such as micro-mirrors). The backside face may be substantially parallel to the front surface, the light emitting surface and/or the interface.

The backlight may then work as follows: (femtosecond-)laser written waveguides, embedded within a thin glass substrate, and labelled bus waveguides carry the laser light from an external laser (which may not be part of the optical device) to all over the surface area of the (transparent) substrate; optical (directional) couplers, via means of evanescent coupling between the waveguides, are provided to distribute the light from the bus waveguides to the waveguides and therefore to various positions on the backside face of the substrate where micro-mirrors or DOEs are located; the latter are used to create light cones that each illuminates a number of pixels of e.g. an SLM (which may not be part of the optical device). By using total internal reflection at the glass-air boundary, those light cones, which would otherwise overlap leading to unwanted interference effects, are cropped and isolated.

The light originating from the external light source, which may be positioned at the edge of the transparent substrate, is distributed over the front surface area using femtosecond-laser written waveguides and beam shaping structures. These waveguides can follow any desired 3D trajectory within the substrate and couple light between them using optical (directional-)couplers. Minimal waveguide spacings of 20 μm are readily achievable, allowing for a very dense waveguide network.

The micro-mirror can be made very small (e.g. <30 μm in diameter), depending on the surface quality of the mirror structure and the freespace propagation distance (in the substrate) of the light beam after it exits the respective waveguide. The reflection from the optical shaping elements, e.g. the micro-mirrors, could either take place purely because of total internal reflection at the glass-air interface, or the mirror structure can be coated with a reflective material (e.g. silver). The optical shaping elements, in particular the micro-mirrors, could also be manufactured by either means for example Glass Press Molding or polymer micro-structure fabrication.

The optical path length from the external light source to the light emitting areas, in particular to an external device such as an SLM, varies and the phase from different spots will therefore be different. These phase offsets can be easily calibrated and compensated for in an SLM. Due to the different path lengths, temperature changes will affect the different phases differently and proportionally to their respective optical path length. To reduce this effect, glass with a very low thermo-optic expansion coefficient can be used for the transparent substrate (e.g. Corning EAGLE XG, $\delta_1 = 31.7 \cdot 10^{-7}/°$ C.) and therefore the phase shift can be small and can be more easily corrected for using e.g. an SLM.

For commercial applications and devices, the optical device, more particular the devices, which it may be used in, like a holographic backlight, should work stable over large temperature ranges, like 0° C. to 70° C. for mobile devices or even −40° C. to 125° C. for the automotive sector. Temperature variations can induce phase shifts between the different pixels (e.g. different light emitting areas) of the optical device, in particular of an SLM illuminated by the optical device, degrading image quality or even altogether destroying it. Still, since the task of an SLM is anyway to introduce phase-shifts on each pixel, any phase shift can be easily compensated for if (a) the phase-shifts occur slowly and (b) the phase-shifts are known. A typical SLM can update the phase value for each pixel within ca. 10 ms in which it can be assumed that a temperature shift of no more than 1 mK takes place under usual conditions. Further, it may for example be assumed that a 0.01° K temperature change takes place in a sample of 100 mm length. The volumetric expansion coefficient of e.g. borosilicate glass is $31.7 \cdot 10^{-7}/°$ K and the refractive index change rate due to temperature change may be $2.2 \cdot 10^{-6}/°$ K. At a wavelength of 450 nm the index of refraction is e.g. $n_0=1.51825$. The total phase change then calculates to 0.5% of a phase-flip and therefore can be seen as negligible.

For longer time-frames and larger temperature drifts condition (b) becomes relevant. The simplest way to counter these phase-shifts is to use Mach-Zehnder-like structures, in particular within the transparent substrate. Therefore, it is advantageous if the optical device comprises:

at least a first and a second interferometer waveguide formed within the substrate, a first interferometer coupler for coupling a light beam from the first interferometer waveguide to the second interferometer waveguide, a second optical interferometer coupler for coupling a light beam from the first interferometer waveguide to the second interferometer waveguide, and a photodetector connected to the first interferometer waveguide. Alternatively, the second optical interferometer coupler may be for coupling a light beam from the second interferometer waveguide to the first interferometer waveguide and the photodetector may be connected to the second interferometer waveguide. Furthermore, alternatively, the optical device, in particular the Mach-Zehnder-like structure, may only comprise:

at least a first and a second interferometer waveguide formed within the substrate, a photodetector for measuring an interference of a light beam from the first interferometer waveguide and a light beam from the second interferometer waveguide.

There can be provided for more than one such Mach-Zehnder-like structure. The photodetector is for example a photodiode. The first and the second interferometer waveguide are comparable to the different arms of a Mach-Zehnder-like interferometer and their lengths may differ. A temperature dependent phase-shift occurs between the first and the second interferometer waveguide which can be read out in terms of intensity fluctuations by the photodetector (e.g. at the end/side face of the substrate). Multiple Mach-Zehnder-like structures can be constructed to increase the measurement accuracy. Preferably, the first interferometer waveguide is configured to receive a light beam emitted from the external light source. Any wavelength can be used, but it is the most convenient to use the same wavelength which is also propagated in the other waveguides. Over a temperature span from 0° C. to 70° C., the total phase drift for waveguides' lengths of 100 mm may be (in above example) $366 \cdot 2\pi$. With one or more Mach-Zehnder-like structure, the phase drifts may be determined and can be compensated for by e.g. an SLM. The length of the first and the second interferometer waveguide should be chosen such that for the maximal expected temperature shift the induced phase shift is not larger than $2\pi$. Additional Mach-Zehnders-like structures can be built with different lengths to increase measurement accuracy.

Another concern is the wavelength stability of the external light source. Vertical-cavity surface-emitting laser (VC-SELs) and Distributed Feedback Laser (DFB) diodes typically have a wavelength stability of 0.07 nm/° C. Therefore, already a wavelength change of 0.002 nm will lead to a $2\pi$ phase difference between pixels that are 100 mm apart. Therefore, the external light source is preferably temperature stabilised, for example as is routinely done for laser diodes used for telecommunication purposes. Advantageously, the external light source can be positioned at a distance from the optical device and a light beam emitted from the external light source guided to the optical device via optical fiber.

In an optional embodiment, the optical device comprises an optical beam divergence reducing structure for reducing the beam divergence of the light beams emitted from the first and the second light emitting area. Preferably, the optical beam divergence structure shapes the light beams emitted from the first and the second light emitting area such that the wavefront of the light beams has the shape of a (spatially limited) plane wave. In this way, a coherent plane wave can be supplied by the optical device. The optical divergence reducing structure is preferably aligned in front of or formed by the interface, the light emitting surface and/or the front surface of the transparent substrate. The optical divergence reducing structure is preferably a DOE or a lens array, in particular a Fresnel array.

Another factor to consider is that the light beams emitted from the interface, which have an angle smaller but close to the critical angle of total internal reflection will have a propagation angle outside the substrate which is almost parallel to the front surface. A DOE or a lens-like structure can be used to create the plane-wave e.g. for use with an SLM. This optical beam divergence reducing structure can be separated from the substrate by air and/or be made e.g. out of a low refractive index material in order to maintain valid the principle of total internal reflection.

In an advantageous embodiment, the optical device is configured for controlling light from at least one further external light source. For example, the optical device may be configured for controlling light from three external light sources, wherein one of them could be a source of blue light (wavelength of 467 nm), one a source of green light (532 nm) and one of red light (630 nm). The optical device can in this way provide a multicolor illumination, for example for a multicolor holographic display. For instance, the first and the second waveguide may also be for guiding a light beam emitted from one of the at least one further external light source, wherein the first waveguide guides the light beam emitted from the one further external light source to the first beam shaping structure and the second waveguide directs the light beam emitted from the one further external light source to the second beam shaping structure; or, alternatively, the optical device may comprise at least a first and a second further waveguide for guiding a light beam emitted from one of the at least one further external light source, and at least a first further beam shaping structure with a first further light emitting area for emitting a light beam and a second further beam shaping structure with a second further light emitting area for emitting a light beam, wherein the first further waveguide guides the light beam emitted from the one of the at least one further external light source to the first further beam shaping structure and the second further waveguide guides the light beam emitted from the one of the at least one external light source to the second further beam shaping structure, wherein the first and the second further beam shaping structure are each configured to increase the uniformity of the radiant density profile of the light beam guided to the respective further beam shaping structure on being emitted from the respective further light emitting area of the respective further beam shaping structure. That is, the light beam emitted from the at least one further external light source, e.g. from three external light sources with each external light source having a different color from a set of three primary colors, can be combined within the same optical device and either co-propagate in the same waveguides (per beam shaping structure) or be propagated in separate waveguides. In particular if the waveguides are laser written waveguides, waveguide spacing of e.g. only 10 μm and without cross-talk is easily achievable, and the beams could e.g. be reflected from the same (or different) optical shaping element, in particular micro-mirrors.

The optical efficiency of the optical device mainly depends on the waveguide propagation loss, the external source to waveguide coupling loss and the amount of total internal reflection. Waveguide propagation loss is e.g. <0.2 dB/cm for all wavelengths and the precise overall loss depends on the waveguide layout (in the substrate). The efficiency of the external light source, in particular laser diode, coupling to the (single-mode) waveguides depends mostly on the mode-match and Fresnel reflections at the optical interfaces. Vertical-cavity surface-emitting lasers (VCSELs) have a circular mode profile which matches the one of the waveguides very well and coupling efficiencies beyond 90% are achievable. In the case of edge-emitting laser diodes the coupling efficiency is lower due to the highly elliptical mode shape. Typically, coupling efficiencies of 50% to 80% can be achieved. The amount of lost light due to total internal reflection depends on the uniformity required and the beam-shaping approach used. Regarding for example a Gaussian beam profile: to achieve a uniformity (Minimum over Maximum) of 80% roughly 50% of the total beam intensity has to be cut (i.e. discarded).

The invention further relates to a backlight unit, comprising an optical device as described herein and comprising the external light source. Preferably, the external light source is a laser diode.

The invention further relates to an optical system, in particular a holographic display, comprising a spatial light modulator, and a backlight unit or an optical device as described herein. In general, the optical device, the backlight unit and/or the optical system could be used for many applications where the creation of a large, coherent wavefront is useful. An example is 3D sensing, either actively via beam steering, where an SLM is used to actively control one or more laser beams for Light Detection and Ranging (LIDAR) applications, or passively, where DOE are used to create structured light.

Structured light sensing or structured light 3D sensing has many promising applications in mobile devices and was introduced by Apple Inc. with their FaceID authentication system. A grid of points is projected into the environment, the distortion of this grid is mapped by a camera which then yields 3D information. Future applications will increase the resolution of the point grid and move from single shots to continuous measurements. Both things are challenging to achieve in terms of accuracy and power consumption but can be easily solved using the optical device, backlight unit or the optical system described herein. The resolution of the point grid depends on the number of beams and their divergence angle which can be strongly increased using the plane-wavefront and modulating it with a DOE. The energy consumption can be decreased by amplifying the signal to noise ratio: due to temperature fluctuations and manufacturing variations of the laser diodes very wide optical spectrum filters (e.g. 25 nm) have to be used in current devices which decreases the signal to noise ratio. Using the presently disclosed optical device, backlight unit or optical system, several laser diodes can be used in parallel and only the one which fits well the much narrower filter-spectrum in a given condition gets turned on. The approach works for any desired wavelength and can be chosen at wish.

Autonomous navigation of cars, drones and robots is heavily depended on the use of LiDAR. Essentially, LiDAR relies on a pulsed laser beam that is scanned over a large area and measuring the delay of the reflections (time-of-flight measurement). While LiDAR is widely used, it is still a very expensive technology which prohibits its adoption in the mass-market. The main difficulty lies with the challenge of steering the laser beam with high accuracy over large distances in an automotive environment with large temperature changes and strong vibrations. Using the presently disclosed optical device, backlight unit or optical system (and a SLM) a compact and very stable LiDAR system can be built. The large possible aperture of the backlight/SLM allows for the use of wide laser beams with very long beam-divergence lengths which increases the sensing distance. Additionally, the price could be very low when produced at scale, both for the laser writing as for the SLM. The design of waveguides for the most commonly used wavelengths in 3D sensing (940 nm and 1550 nm) is straightforward. Additionally, it is also possible to build a Flash LiDAR with collimated beams and avoid active beam steering.

BRIEF DESCRIPTION OF THE DRAWINGS

By way of example, the invention is further explained with respect to some selected embodiments shown in the drawings. However, these embodiments shall not be considered limiting for the invention. The figures show.

DESCRIPTION OF EXAMPLE EMBODIMENTS

Figure 1:
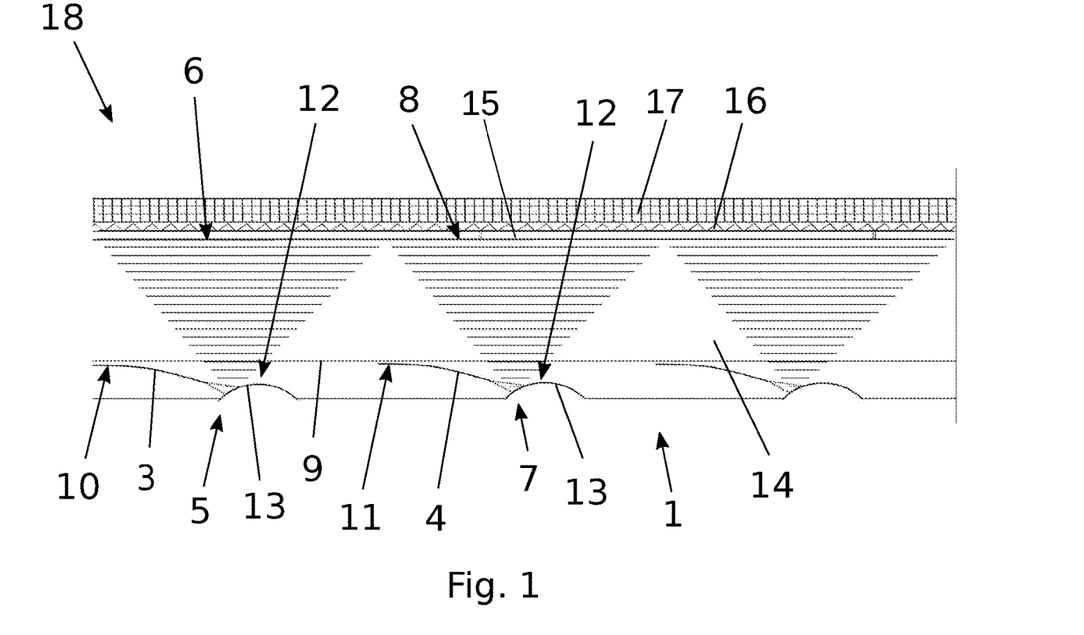
FIG. 1 a preferred embodiment of the optical device.

FIG. 1 shows a preferred embodiment of the optical device 1 for controlling light from an external light source 2 (which is not part of this embodiment), e.g. a laser diode with a Gaussian beam shape. The optical device 1 comprises a first waveguide 3, a second waveguide 4 and one further waveguide. It may of course include more than one further waveguides. Furthermore, the optical device 1 comprises a first beam shaping structure 5 with a first light emitting area 6 and a second beam shaping structure 7 with a second light emitting area 8. The optical device 1 also comprises a bus waveguide 9. The bus waveguide 9 is configured for guiding a light beam emitted from the external light source and has a first optical coupler 10 and a second optical coupler 11, wherein the first optical coupler 10 couples a light beam emitted from the external light source from the bus waveguide 9 to the first waveguide 3 and the second optical coupler 11 couples a light beam emitted from the external light source from the bus waveguide 9 to the second waveguide 4. More concretely, each of the optical couplers 10, 11 redirects a fraction of the light beam guided by the bus waveguide 9 to the respective first and second waveguide 3, 4. Subsequently, the first waveguide 3 guides the light beam emitted from the external light source to the first beam shaping structure 5 and the second waveguide 4 guides the light beam emitted from the external light source to the second beam shaping structure 7.

The first beam shaping structure 5 and the second beam shaping structure 7 are each configured such that the uniformity of the radiant density profile of a light beam emitted from the respective light emitting area 6, 8 of the respective beam shaping structure 5, 7 is higher than that of the light beam guided to the respective beam shaping structure 5, 7 by the respective waveguide 3, 4. The first and the second beam shaping structure 5, 7 each comprise a respective optical shaping element 12 and the first and the second waveguides 3, 4 direct the light beam emitted from the external light source at the respective optical shaping element 12. The optical shaping elements 12 are configured for manipulating the wavefront of the light beam directed at the respective optical shaping element 12. In this embodiment, the optical shaping elements 12 are optical diverging element 13, in particular (curved) micro-mirrors, which widen the opening angle of the light beam. Due to the widening of the beam angle, the light emitting areas 6, 8 can also be closer to the respective optical shaping elements 12, while providing the same total area of illumination.

The optical device 1 comprises a transparent substrate 14. The first waveguide 3, the second waveguide 4 and the bus waveguide 9 are formed within the transparent substrate 14, in particular by direct laser writing. A front surface of the transparent substrate 14 provides an interface 15, which in the present case is a boundary of the substrate 14 and air. The first and the second light emitting areas 6, 8 are provided by the interface 15. The first and the second light emitting areas 6, 8 area each delimited by total internal reflection occurring outside the respective light emitting area 6, 8 for the light beam directed towards the interface 15 after interfering with the respective optical shaping element 12. It is noted that in FIG. 1 only that part of the beam reflected from the optical shaping elements 12 is shown which passes the interface 15, i.e. which is not subject to total internal reflection at the interface 15. In contrast, in FIGS. 2 to 6 the part of the light beam that will be reflected at the interface 15 is depicted. By using the optical diverging element 13 to widen the light beam and subsequently the total internal reflection at the interface 15, the uniformity of the radiant density profile of the light beam emitted from the respective light emitting area 6, 8 can be increased. Alternatively, the optical shaping elements 12 could of course be optical profiler elements 19 (see FIGS. 5 and 6), which can increase the uniformity of the radiant density profile of the light beam emitted from the respective light emitting area 6, 8 (in combination with total internal reflection at the interface 15, or without as well). The critical angle of total reflection is, as is well known, determined by the refractive indices of the transparent substrate and the—in this embodiment—air. The optical shaping elements 12 (or their widening of the light beam, respectively), their distance from the interface 15 and the critical angle of total reflection at the interface 15 (or the relevant refractive indices, respectively) are configured such that the first light emitting area 6 is not overlapping with the second light emitting areas 8.

In this embodiment, the first and the second beam shaping structures 5, 7 are consequently formed by the respective optical shaping element 12 and the interface 15, at which total reflection occurs outside the respective light emitting area 6, 8.

The present invention allows the optical device 1 to be very thin, and the transparent substrate 14 can be a thin plate, in which case FIG. 1 is a view of a section parallel to the smaller dimensions of the transparent substrate 14. The optical shaping elements 12 are formed at a backside face of the transparent substrate 14. The backside face (excluding the indentation forming the optical shaping elements 12) is substantially parallel to the interface 15. Advantageously, since the front surface and the backside face of the substrate 14 are parallel, that part of the light beam that was reflected from the interface 15 due to total internal reflection could either leave the substrate through the backside face (if it has a higher critical angle than the interface), or be repeatedly reflected from the backside face and the front surface of the substrate, such that it will in the end be emitted from the side faces of the substrate 14. Thus, it is not emitted from the interface and it will not interfere with the light beams emitted from the light emitting areas 6, 8. The small amount of light that was total internal reflected from the interface 15 and subsequently is scattered by some other optical shaping element 12 at the interface 15 in an angle lower than the critical angle and therefore emitted from the interface 15 is negligible.

The optical device 1 further comprises an optical beam divergence reducing structure 16 for reducing the beam divergence of the light beams emitted from the first and the second light emitting area 6, 8. The optical beam divergence reducing structure 16 is a DOE which preferably transforms the light emitting from the light emitting areas 6, 8 into (spatially limited) plane waves. Furthermore, FIG. 1 shows an SLM 17 for modulating the phase of emitted light on top of the optical device 1. Instead of the SLM 17, also DOEs could be used to create static light pattern. FIG. 1 can also be considered to show a detail of an optical system 18, in particular excluding the external light source.

Figure 2:
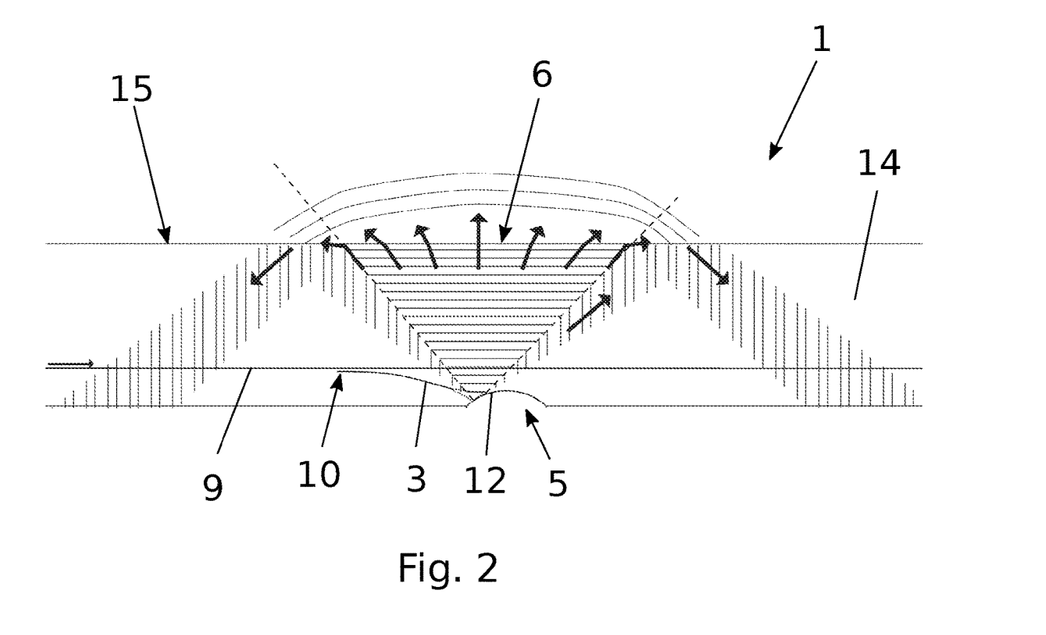
FIG. 2 a detail of a preferred embodiment of the optical device with a micro-mirror as optical shaping element.
Figure 3:
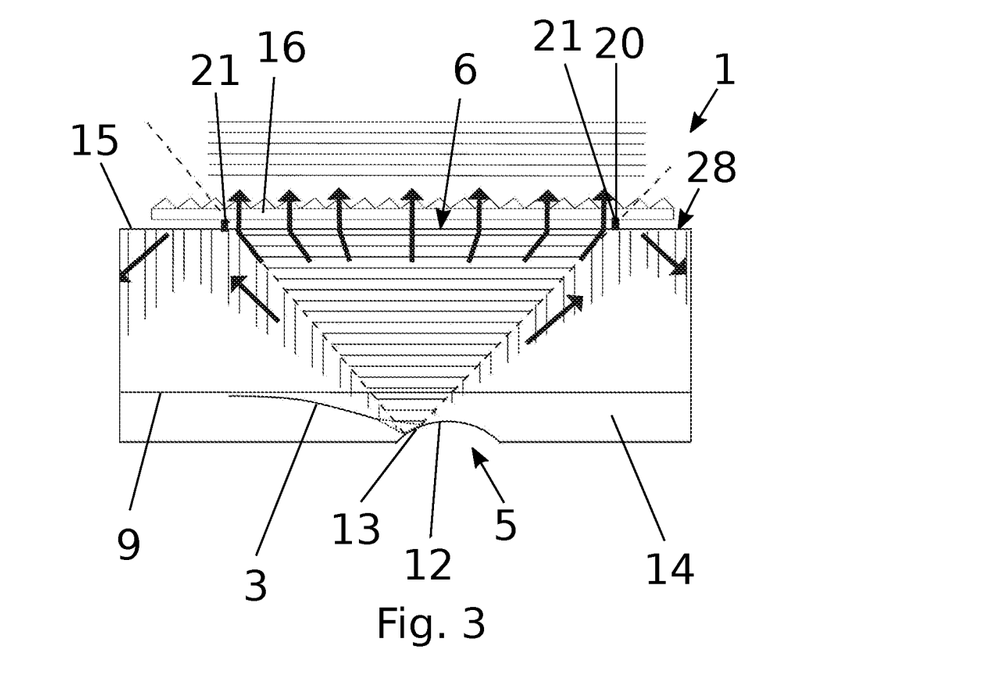
FIG. 3 a detail of another preferred embodiment of the optical device with a micro-mirror as optical shaping element and a DOE as an optical beam divergence reducing structure.
Figure 4:
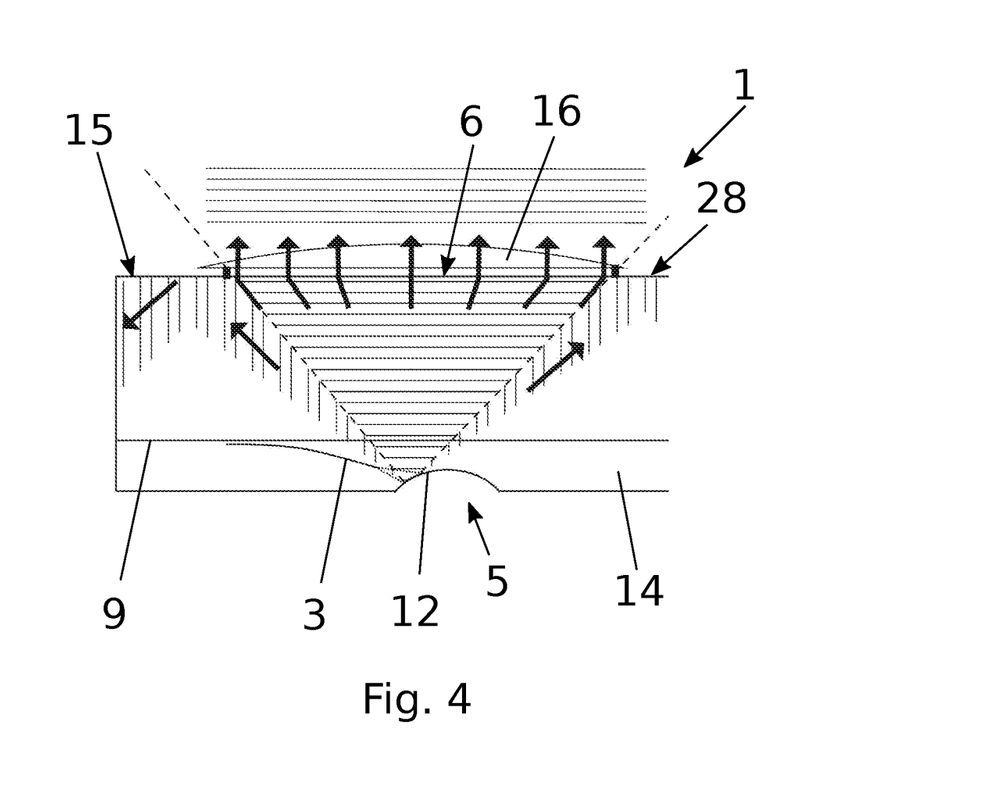
FIG. 4 a detail of another preferred embodiment of the optical device with a micro-mirror as optical shaping element and a lens as an optical beam divergence reducing structure.
Figure 5:
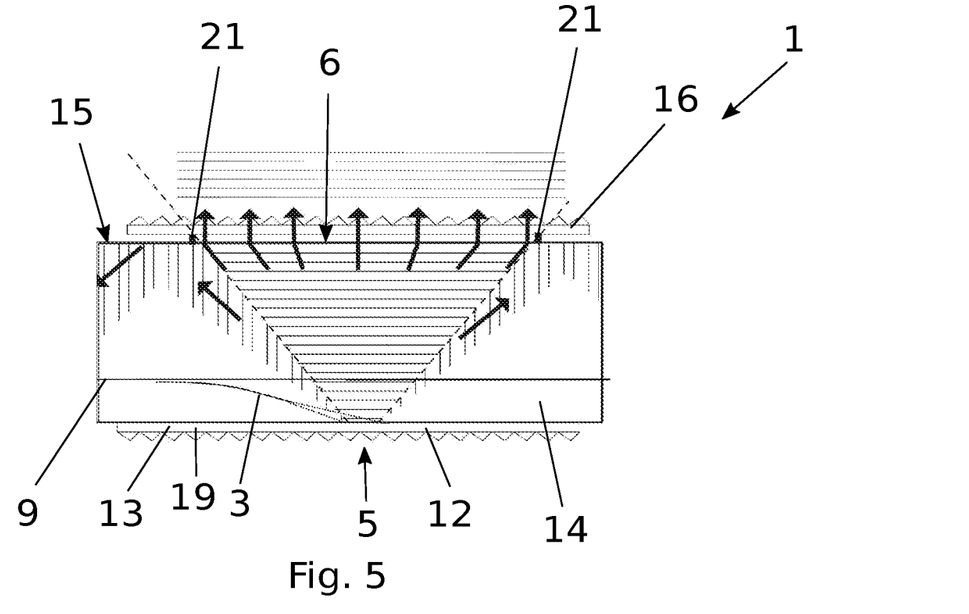
FIG. 5 a detail of another preferred embodiment of the optical device with a DOE as optical shaping element and a second DOE as an optical beam divergence reducing structure.
Figure 6:
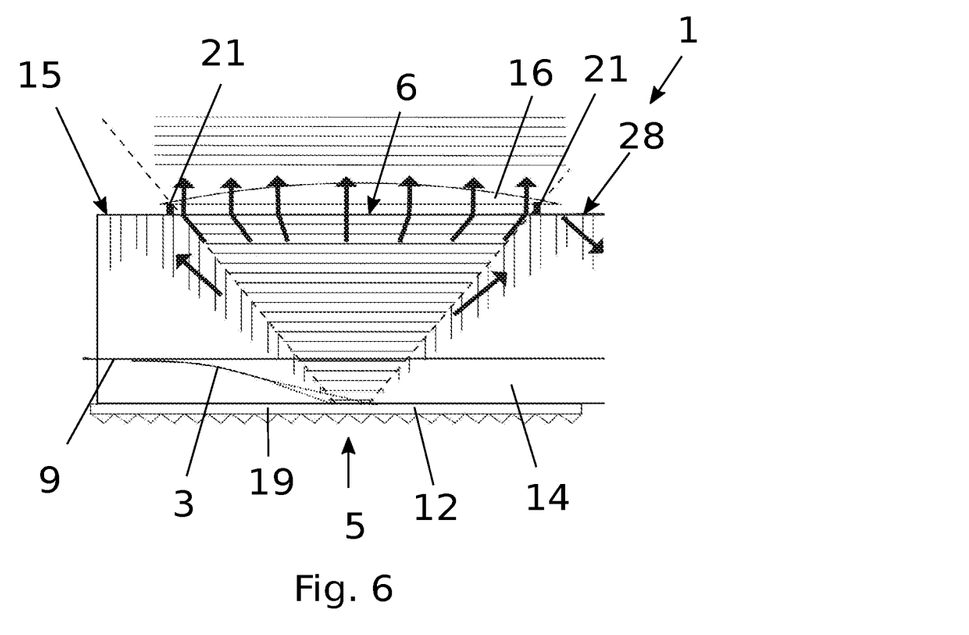
FIG. 6 a detail of another preferred embodiment of the optical device with a DOE as optical shaping element and an optical beam divergence reducing structure.

FIGS. 2 to 6 each show a detail of a preferred embodiment of the optical device 1. For example, they do not show the second waveguide 4. The optical device 1 works analogously to the one described in the context of FIG. 1. Similar to the embodiment shown in FIG. 1, the light beam emitted from an external light source 2 (not part of the optical device 1) is guided by a bus waveguide 9 and partially coupled to the first waveguide 3, which in turn directs the light beam at the optical shaping element 12, which is an optical diverging element 13. In FIGS. 2 to 4, the optical shaping element 12 is a micro-mirror formed by a backside face of the substrate 14. In FIGS. 5 and 6, the optical shaping element 12 is formed as a DOE touching and aligned with the backside face of the substrate 14. The optical shaping element 12 in FIGS. 5 and 6 may simultaneously be an optical profiler element 19. In all of FIGS. 2 to 6 it can be seen that the optical shaping element 12 widens the opening angle of the light beam directed at the optical shaping element 12. Furthermore, it can be seen that that fraction of the light beam directed by the optical shaping element 12 at the interface 15, which has an incident angle that is larger than the critical angle, is reflected at the interface 15.

The embodiments shown in FIGS. 3 to 6 further comprise a honeycomb structure 20 with the border of one cell 21 encompassing the first light emitting area 6. The honeycomb structure 20 is on top of and touching a light emitting surface 28, which provides the first light emitting area 6. The light emitting surface 28 is in this embodiment provided by the front surface of the substrate 14, i.e. (in this embodiment) the interface 15. The honeycomb structure 20 is made of an absorptive material. The total internal reflection at the interface 15 usually only allows the light emitting areas 6, 8 to be elliptical. In particular, the light emitting areas 6, 8 can for example be circular in case the optical shaping elements 12 are micro-mirrors, or can be of any shape, in case the optical shaping elements 12 are DOEs. Thus, it would not be possible to homogeneously emit a larger area of the interface without the light emitting areas 6, 8 to overlap or, respectively, the light beams from different waveguides 3, 4 to mix and therefore not have a well-defined phase. The honeycomb structure 20 has a certain (cell) height normal to the front surface of the substrate 14. In this way, the area illuminated by the individual light emitting areas 6, 8 can be shaped by the walls of the cell 21 having a varying distance from the respective light emitting area 6, 8 (see FIG. 8) and therefore absorbing varying fractions of the light beam emitted from border regions of the light emitting areas 6, 8

The embodiments shown in FIGS. 3 to 6 further comprise an optical beam divergence reducing structure 16. Therefore, the light beams will ultimately be emitted from the optical device 1 in FIGS. 3 to 6 as a (spatially limited) plane wave, which it is not in FIG. 2. The fat arrows indicate the direction of the light beams and in particular their refraction and reflection at the interface 15. It is noted that those arrows are only for illustration purposes and are not precise; for example, in FIGS. 3 to 6, they already seem to indicate a plane wave prior to the optical beam divergence reducing structure 16, which is not the case.

Figure 7:
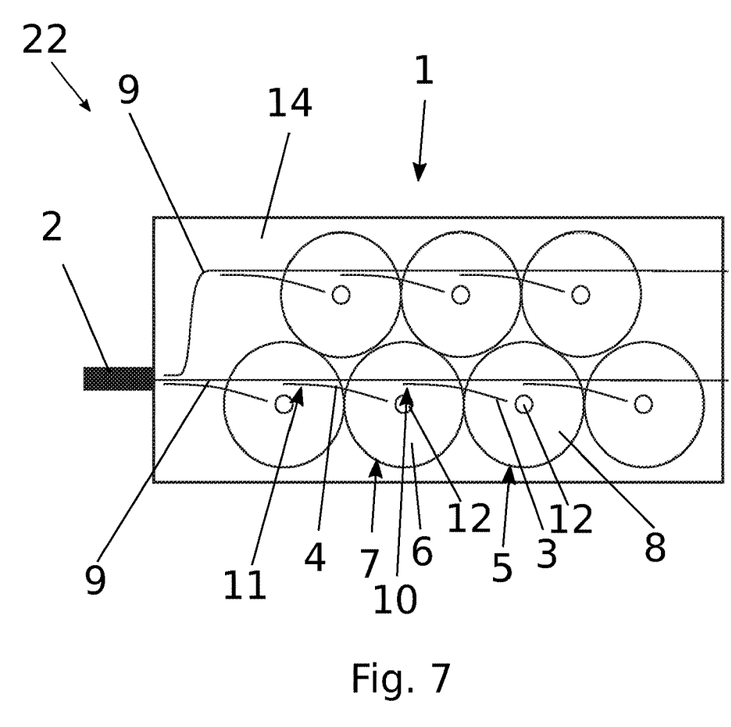
FIG. 7 a preferred embodiment of the backlight unit in a diagrammatic top view.
Figure 8:
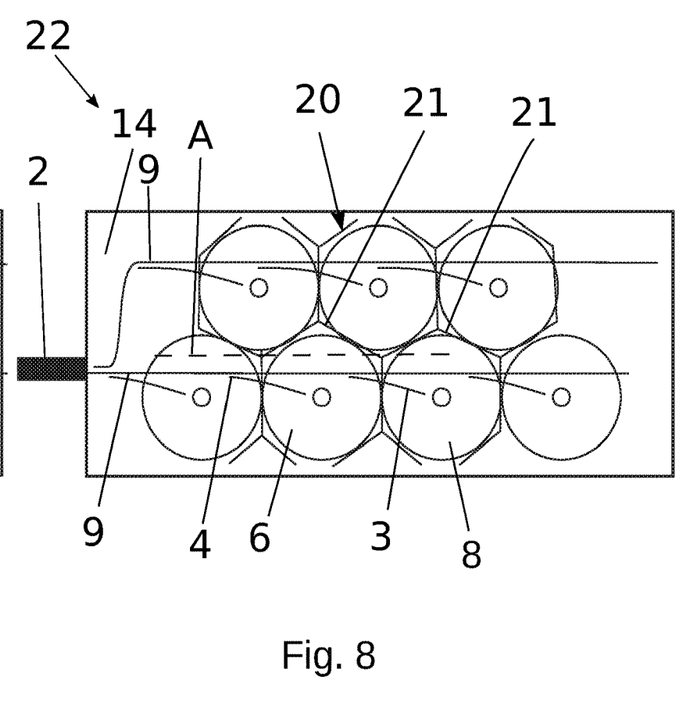
FIG. 8 another preferred embodiment of the backlight unit in a diagrammatic top view.

FIGS. 7 and 8 are top views of the backlight unit 22, which includes the optical system 1 and the external light source 2. The optical system 1 works similar as described in the context of FIGS. 1 to 6. The light beam emitted from the external light source 2 is coupled into the higher ranking bus waveguide 9, from where a fraction is in turn coupled into the lower-ranking bus waveguide 9. Both from the higher ranking and the lower ranking bus waveguides 9, the light beam is coupled into waveguides 3, 4 and guided to the beam shaping structures 5, 7. From the optical shaping elements 12 of the beam shaping structures 5, 7 the light beams are directed towards the front surface of the substrate 15 and are emitted from the light emitting areas 6, 8. The embodiment of FIG. 8 includes, in contrast to the embodiment of FIG. 7, a honeycomb structure 20. It can be seen that the cells 21 of the honeycomb structure 20 are hexagonal and each encompass one light emitting area 6, 8, such that the filling factor of illumination of a larger area can be increased.

Figure 9:
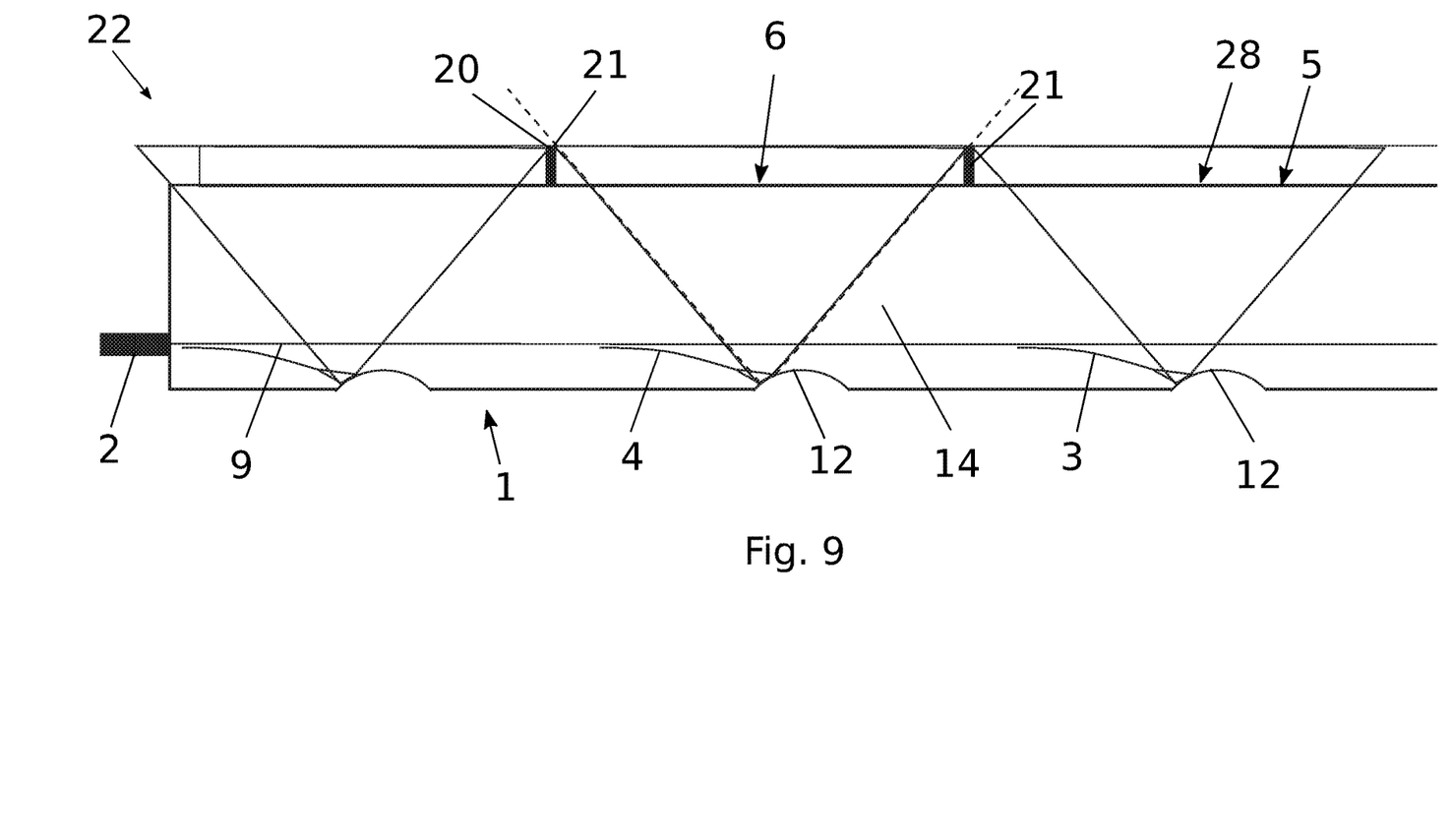
FIG. 9 backlight unit in the same embodiment as FIG. 8 in a diagrammatic sectional view.

FIG. 9 is a diagrammatic sectional view of the embodiment of the backlight unit 22 of FIG. 8 along the plane indicated by A in FIG. 8 (normal to the drawing plane). It can be seen that for this section along line A, the walls of the cells 21 of the honeycomb structure 20 are distanced from the light emitting areas 6, 8.

Figure 10:
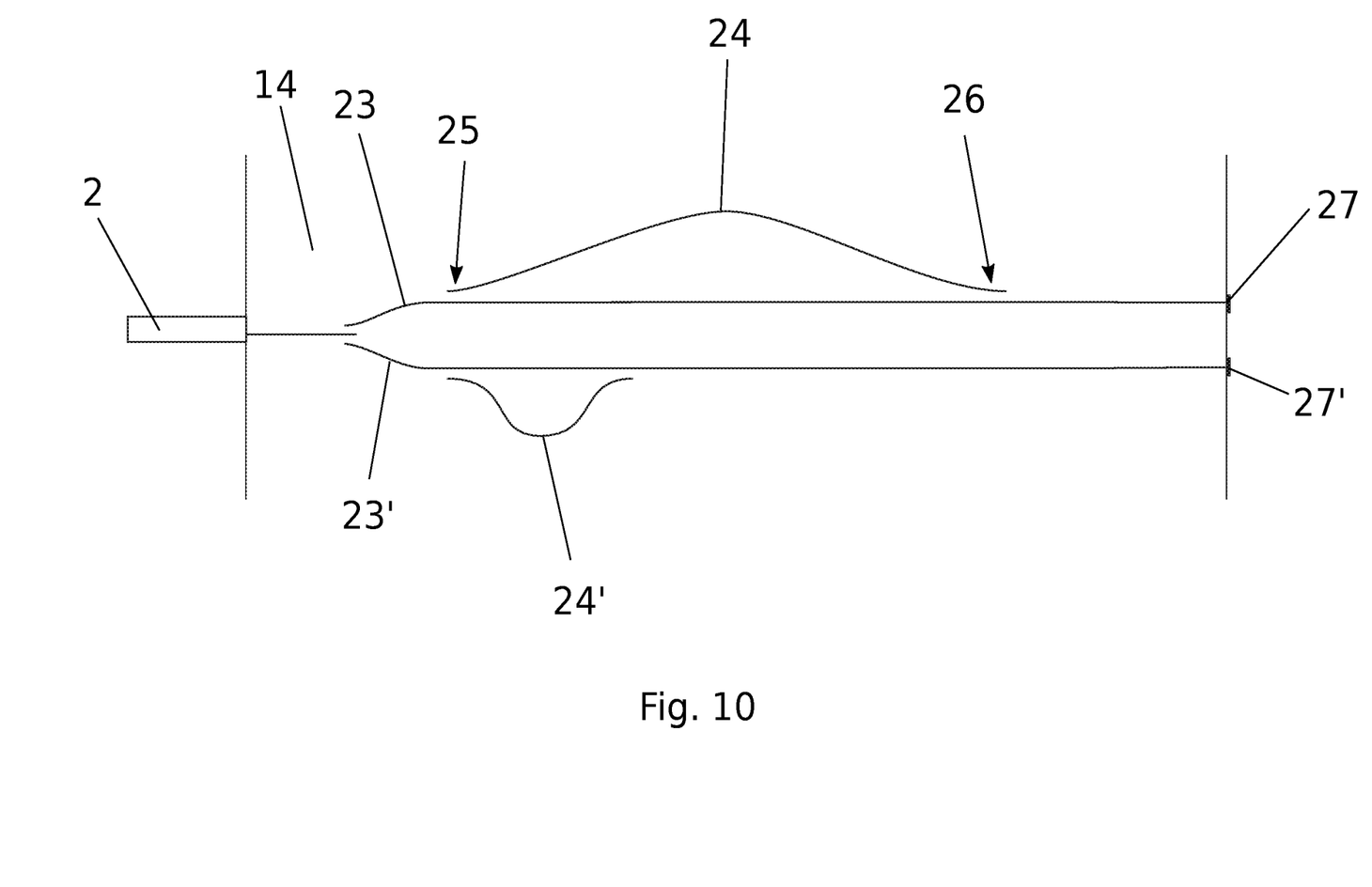
FIG. 10 a Mach-Zehnder-like structure of a preferred embodiment of the optical device.

FIG. 10 shows a Mach-Zehnder-like structure, which can be used to determine temperature dependent changes in optical path lengths and therefore phase changes. A light beam is coupled from the external light source 2 into a waveguide in the substrate 14, which waveguide can for example be a bus waveguide 9. From that waveguide, the light beam is coupled into a first interferometer waveguide 23, formed within the substrate 14. A fraction of the light beam is then coupled into the second interferometer waveguide 24 by the first interferometer coupler 25. Subsequently, the light beam is coupled from the second interferometer waveguide 24 back into the first interferometer waveguide 23, where it interferes with that fraction of the light beam, which was not coupled into the second interferometer waveguide 24. Subsequently, the interference of the light beam which solely propagated in the first interferometer waveguide 23 and the light beam which also propagated in the second interferometer 24 is measured in the photodetector 27 connected to the first interferometer waveguide 23. Thermal expansion of the substrate 14 will then lead to changes in the interference measured by the photodetector 27 (depending, e.g., on the path of the first and the second interferometer waveguides 23, 24). FIG. 10 shows a second Mach-Zehnder-like structure, wherein the second interferometer waveguide 24' is connected to the first interferometer waveguide 23' at a shorter distance than for the Mach-Zehnder-like structure formed by the interferometer waveguides 23, 24. The light beam of the second Mach-Zehnder-like structure is then coupled into another photodetector 27'. The use of more than one such Mach-Zehnder-like structure, with different layouts of interferometer waveguides 23, 24, 23', 24' allows for a more sensitive temperature calibration.

The invention claimed is:

1. Optical device for controlling light from an external light source comprising:
   at least a first and a second waveguide for guiding a light beam emitted from the external light source, and
   at least a first beam shaping structure with a first light emitting area for emitting a light beam and a second beam shaping structure with a second light emitting area for emitting a light beam, wherein the first waveguide guides the light beam emitted from the external light source to the first beam shaping structure and the second waveguide guides the light beam emitted from the external light source to the second beam shaping structure,
   wherein
   the first and the second beam shaping structure are each configured such that the uniformity of the radiant density profile of a light beam emitted from the respective light emitting area of the respective beam shaping structure is higher than that of the light beam guided to the respective beam shaping structure by the respective waveguide, and
   wherein an optical beam divergence reducing structure is provided for reducing the beam divergence of the light beams emitted from the first and the second light emitting area.

2. The optical device according to claim 1, wherein the first and the second beam shaping structure each comprise an optical shaping element and the first and the second waveguides direct the light beam emitted from the external light source at the respective optical shaping element of the first and the second beam shaping structure, and the optical shaping elements are configured for manipulating the wavefront of the light beam directed at the respective optical shaping element.

3. The optical device according to claim 2, wherein the optical shaping element of the first and/or the second beam shaping structure is an optical profiler element configured to increase the uniformity of the radiant intensity profile of the light beam directed at the respective optical shaping element.

4. The optical device according to claim 2, wherein the optical shaping element of the first and/or the second beam shaping structure is an optical diverging element configured to increase the beam divergence of the light beam directed at the respective optical diverging element.

5. The optical device according to claim 2, wherein the optical device comprises an interface, wherein the first and the second light emitting area are provided by the interface and are each delimited by total internal reflection occurring outside the respective light emitting area for the light beam directed towards the interface after interfering with the respective optical shaping element.

6. The optical device according to claim 5, wherein the first light emitting area is non-overlapping with the second light emitting area.

7. The optical device according to claim 1, wherein the optical device comprises a light emitting surface, wherein the first and the second light emitting area are provided by the light emitting surface and wherein a honeycomb structure of an absorptive material is provided on top of the light emitting surface, wherein a first cell of the honeycomb structure encompasses the first light emitting area and a second cell of the honeycomb structure encompasses the second light emitting area.

8. The optical device according to claim 1, wherein the optical device comprises at least one bus waveguide for guiding the light beam emitted from the external light source and at least a first and a second optical coupler, wherein the first optical coupler couples light emitted from the external light source from the bus waveguide to the first waveguide and the second optical coupler couples the light beam emitted from the external light source from the bus waveguide to the second waveguide.

9. The optical device according to claim 1, further comprising a transparent substrate, wherein the first and the second waveguide are formed within the transparent substrate.

10. Optical device according to claim 9, wherein at least a first and a second interferometer waveguide formed within the substrate,
    a first interferometer coupler for coupling a light beam from the first interferometer waveguide to the second interferometer waveguide,
    a second optical interferometer coupler for coupling a light beam from the first interferometer waveguide to the second interferometer waveguide, and
    a photodetector connected to the first interferometer waveguide.

11. Optical device according to claim 1, wherein it is configured for controlling light from at least one further external light source.

12. Backlight unit, comprising an optical device according to claim 1 and comprising the external light source as a laser.

13. Optical system comprising a holographic display, and comprising a spatial light modulator, and further comprising a backlight unit according to claim 12.

14. Optical device for controlling light from an external light source comprising:
    at least a first and a second waveguide for guiding a light beam emitted from the external light source, and
    at least a first beam shaping structure with a first light emitting area for emitting a light beam and a second beam shaping structure with a second light emitting area for emitting a light beam, wherein the first waveguide guides the light beam emitted from the external light source to the first beam shaping structure and the second waveguide guides the light beam emitted from the external light source to the second beam shaping structure,
    wherein
    the first and the second beam shaping structure are each configured such that the uniformity of the radiant density profile of a light beam emitted from the respective light emitting area of the respective beam shaping structure is higher than that of the light beam guided to the respective beam shaping structure by the respective waveguide,
    wherein the first and the second beam shaping structure each comprise an optical shaping element and the first and the second waveguides direct the light beam emitted from the external light source at the respective optical shaping element of the first and the second beam shaping structure, and the optical shaping elements are configured for manipulating the wavefront of the light beam directed at the respective optical shaping element, and
    wherein the optical device comprises an interface, wherein the first and the second light emitting area are provided by the interface and are each delimited by total internal reflection occurring outside the respective light emitting area for the light beam directed towards the interface after interfering with the respective optical shaping element.

15. The optical device according to claim 14, wherein the optical shaping element of the first and/or the second beam shaping structure is an optical profiler element configured to increase the uniformity of the radiant intensity profile of the light beam directed at the respective optical shaping element.

16. The optical device according to claim 14, wherein the first light emitting area is non-overlapping with the second light emitting area.

17. The optical device according to claim 14, wherein the optical device comprises at least one bus waveguide for guiding the light beam emitted from the external light source and at least a first and a second optical coupler, wherein the first optical coupler couples light emitted from the external light source from the bus waveguide to the first waveguide and the second optical coupler couples the light beam emitted from the external light source from the bus waveguide to the second waveguide.

18. Optical device for controlling light from an external light source comprising:
    at least a first and a second waveguide for guiding a light beam emitted from the external light source, and
    at least a first beam shaping structure with a first light emitting area for emitting a light beam and a second beam shaping structure with a second light emitting area for emitting a light beam, wherein the first waveguide guides the light beam emitted from the external light source to the first beam shaping structure and the second waveguide guides the light beam emitted from the external light source to the second beam shaping structure, wherein the first and the second beam shaping structure are each configured such that the uniformity of the radiant density profile of a light beam emitted from the respective light emitting area of the respective beam shaping structure is higher than that of the light beam guided to the respective beam shaping structure by the respective waveguide, wherein the optical device comprises a light emitting surface, wherein the first and the second light emitting area are provided by the light emitting surface and wherein a honeycomb structure of an absorptive material is provided on top of the light emitting surface, wherein a first cell of the honeycomb structure encompasses the first light emitting area and a second cell of the honeycomb structure encompasses the second light emitting area.

19. Optical device for controlling light from an external light source comprising:

at least a first and a second waveguide for guiding a light beam emitted from the external light source, and at least a first beam shaping structure with a first light emitting area for emitting a light beam and a second beam shaping structure with a second light emitting area for emitting a light beam, wherein the first waveguide guides the light beam emitted from the external light source to the first beam shaping structure and the second waveguide guides the light beam emitted from the external light source to the second beam shaping structure, wherein the first and the second beam shaping structure are each configured such that the uniformity of the radiant density profile of a light beam emitted from the respective light emitting area of the respective beam shaping structure is higher than that of the light beam guided to the respective beam shaping structure by the respective waveguide, further comprising a transparent substrate, wherein the first and the second waveguide are formed within the transparent substrate, and wherein at least a first and a second interferometer waveguide formed within the transparent substrate, a first interferometer coupler for coupling a light beam from the first interferometer waveguide to the second interferometer waveguide, a second optical interferometer coupler for coupling a light beam from the first interferometer waveguide to the second interferometer waveguide, and a photodetector connected to the first interferometer waveguide.

* * * * *